United States Patent

Liu

[11] Patent Number: 5,909,327
[45] Date of Patent: Jun. 1, 1999

[54] CONVEX LENS ASSEMBLY FOR MONITORING

[76] Inventor: Cheng-Shun Liu, No. 7-2, Alley 2, Lane 45, Kuang Chen Street, Panchiao City, Taipei Hsien, Taiwan

[21] Appl. No.: 08/923,550

[22] Filed: Sep. 4, 1997

[51] Int. Cl.[6] .............................. G02B 7/182; G02B 7/02
[52] U.S. Cl. ............................................ 359/872; 359/819
[58] Field of Search .................................... 359/819, 838, 359/872

[56] References Cited

U.S. PATENT DOCUMENTS 3,316,052   4/1967   Ross ........................................ 350/293

*Primary Examiner*—Georgia Epps
*Assistant Examiner*—Suzanne Letendre

[57] ABSTRACT

A convex lens assembly including a back board holding a convex lens, a mounting frame fastened to a support of a building, a ball socket fastened to the back board, a socket cover fastened to the back board to hold down the ball socket, and a ball head connecting rod having a ball head at one end coupled to the ball socket and a threaded rod at an opposite end fixedly connected to the mounting frame, wherein the back board is integrally molded from impart resisting plastic and mounted around the ball head connecting rod, having an annular groove at a front side near the border which receives a flanged border area of the convex lens, a plurality of locating rods pressed at the flanged border area of the convex lens to hold down the convex lens, a circular mounting hole at the center of its back side which receives the ball socket, and a plurality of locating notches equiangularly spaced around the circular mounting hole; the socket cover has a plurality of threaded locating strips perpendiculary raised from the border and respectively inserted through the locating notches of the back cover within the circular mounting hole and then fixed in place by a lock nut, one locating strip being made greater than the other locating strips for directioning in installation.

2 Claims, 7 Drawing Sheets

CONVEX LENS ASSEMBLY FOR MONITORING

BACKGROUND AND SUMMARY OF THE INVENTION

The present invention relates to a convex lens assembly designed for use in a supermarket, shop, etc., for monitoring a particular area, and more particularly to such a convex lens which is easy to install and inexpensive to manufacture, and can be conveniently adjusted to the desired angle.

FIGS. 1 and 2 show a convex lens assembly according to the prior art. This structure of convex lens assembly comprises a back board holding an acrylic convex lens, and a mounting frame adapted for securing the back board to support means of a building. This structure of convex lens assembly is somewhat functional, however it has numerous drawbacks as outline hereinafter.

1. The assembly process of the back board and the acrylic convex lens is complicated because it is done by: marking four equiangularly spaced through holes at the back board around its border, then mounting a packing rubber around the border of the convex lens and the back board, then attaching four clamping plates to the convex lens and the back board to hold down the packing rubber, and then fastening screws to a respective through hole of the clamping plates and the through holes of the back board to secure the clamping plates in place.

2. The back board must be made with four equiangularly spaced through holes at the center so that four screws which are mounted with a respective washer can be inserted through the through holes from the inner side of the back board to its outer side and then through four locating holes in corners of a ball socket and then fastened up with a respective nut to fix the ball socket in place. When the ball socket is installed, three screws are respectively fastened to three screw holes of the ball socket to fix a socket cover to the ball socket, permitting a ball head connecting rod to be retained to the ball socket. However, when fastening the socket cover to the ball socket, the direction of the radial opening of the socket cover must be accurately confirmed so that the ball head connecting rod can be turned to the desired angle. If the radial opening of the socket cover is not set in the correct direction, the socket cover must be disconnected from the ball socket and installed in the correct position again.

3. When the mounting base and supporting bar of the mounting frame are fixedly connected together, an extension bar may be used and connected between the ball head connecting rod and the supporting bar to extend the space between the back board and the support means of the building. However, because the mounting holes of the supporting bar and the mounting holes of the extension bar and round holes, two hand tools must be used to hold a screw and a nut respectively so that the screw and the nut can be fastened up to fix the supporting bar and the extension bar together.

4. The whole assembly of the convex lens assembly is complicated because it is comprised of a big number of parts including the back board, the convex lens, the ball socket, the ball head connecting rod, screws, the socket cover, the rubber packing strip, the clamping plates, screws, washers, screws, nuts, mounting base, supporting bar, extension bar, screw, and nut. Processing the back board with holes is also a complicated job.

5. When a screw drops to the inside the ball socket must be disconnected from the ball socket cover so that the fallen screw can be taken out.

The present invention has been accomplished to provide a convex lens assembly which eliminates the aforesaid drawbacks.

According to one aspect of the present invention, the convex lens assembly comprises a back board holding a convex lens, a mounting frame fastened to a support of a building, the mounting frame comprised of a mounting base, an extension bar, and a supporting bar connected between the mounting base and the extension bar, a ball socket fastened to the back board, a socket cover fastened to the back board to hold down the ball socket, and a ball head connecting rod having a ball head at one end coupled to the ball socket and threaded rod at an opposite end fixedly connected to the mounting frame, wherein the back board is integrally molded from impart resisting plastic, comprising an annular groove at its front side near the border which receives a flanges border area of the convex lens, a plurality of locating rods equiangularly spaced along therannular groove and pressed at the flanges border area of the convex lens to hold down said convex lens, a circular mounting hole at the center of its back side which receives the ball socket, and a plurality of locating notches equiangularly spaced around the circular mounting hole of the back board; the socket cover comprises a plurality of threaded locating strips perpendicularly raised from the border of its circular base and respectively inserted through the locating notches of the back cover within the circular mounting hole of the back board and then fixed in place by a lock nut. According to another asepct of the present invention, the mounting holes of the supporting bar of the mounting frame and the mounting holes of the extension bar are square holes; the screws which are used to fix the supporting bar to the mounting base and the extension bar have a square shoulder fitting the respective mounting holes of the supporting bar and the extension bar. By means of this arrangement, the nuts can be conveniently threaded onto the screws to fix the extension bar and the supporting bar together without using a hand tool to hold the screws. According to still another aspect of the present invention, one locating notch of the back board has a relatively greater size than the other locating notches of the back board; one locating strip of the socket cover has a greater size than the other locating strips of the socket cover, the bigger locating strip of the socket cover being aimed at the notch of the socket cover and fitting the bigger locating notch of the back board. Therefore, the socket cover can be quickly installed in the correct direction.

DETAILED DESCRIPTION OF THE PREFERRED EMBODIMENT

Figure 1:
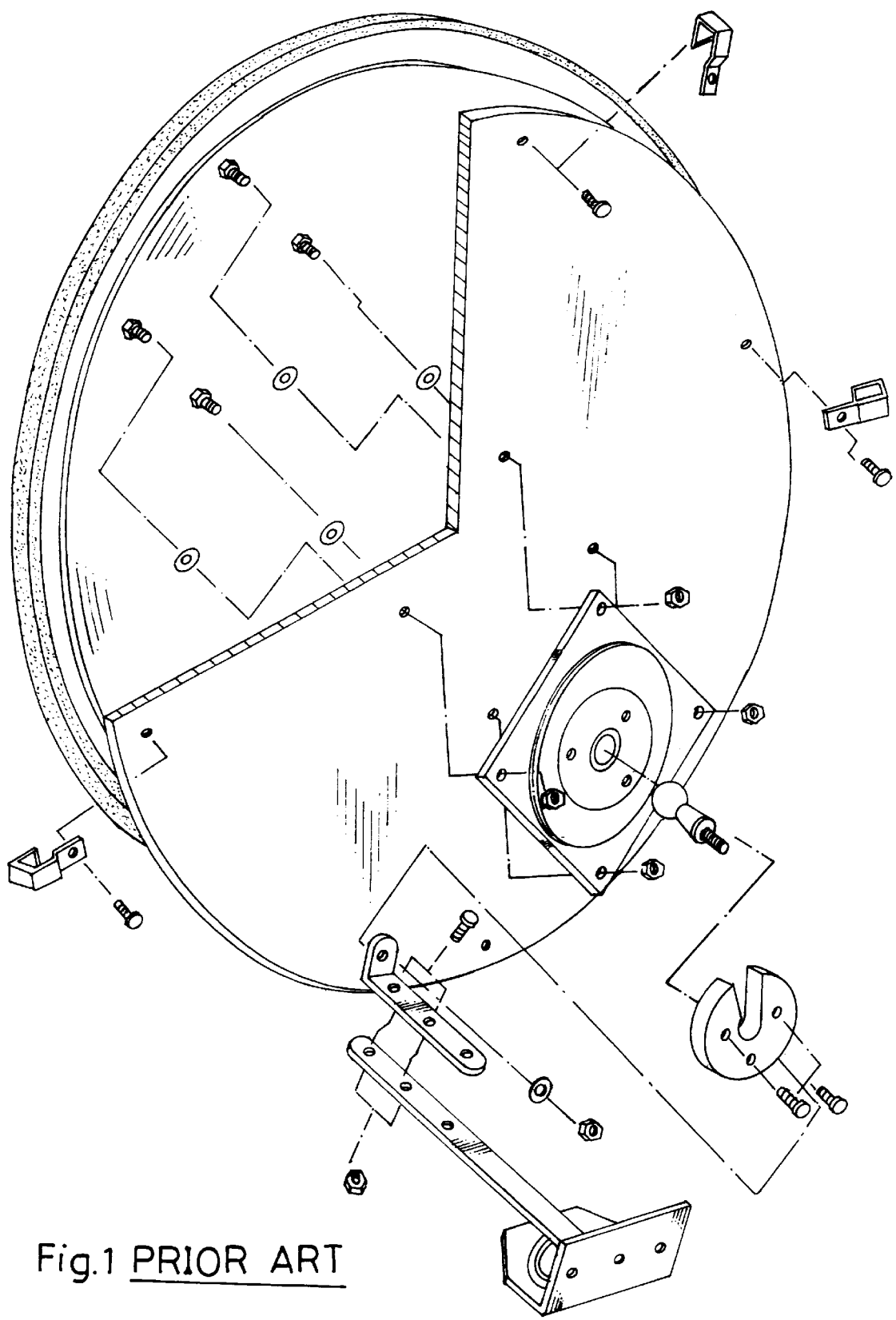
FIG. 1 is an exploded view of a convex lens assembly according to the prior art.
Figure 2:
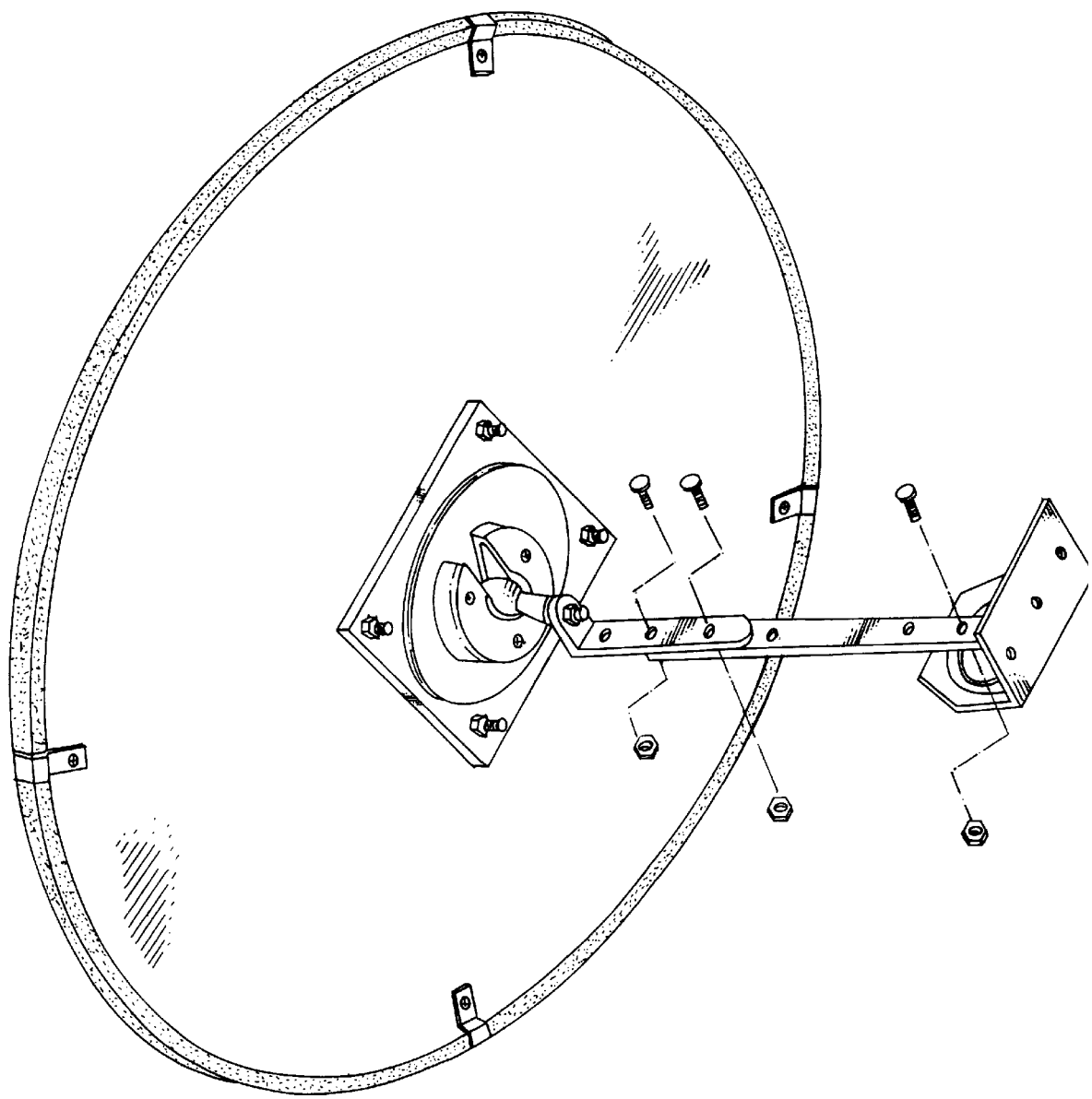
FIG. 2 is an assembly view of the convex lens assembly shown in FIG. 1.

Referring to FIGS. from 3 to 4, a convex lens assembly in accordance with the present invention is generally comprised of a back board 1, an acrylic convex lens 2, a ball head connecting rod 3, a ball socket 4, a ball socket cover 5, and a mounting frame 6.

The convex lens 2 is fastened to the back board 1. The back board 1 has an air vent 20. The ball head connecting rod 3 has a front end 31 terminating in a ball head 311, and an opposite end 32 terminating in an threaded rod 321. The ball socket 4 is fastened to the back board 1, comprising a rounded recess 41 which holds the ball head 311 of the ball head connecting rod 3, and a plurality of screw holes 42 equiangularly spaced around the rounded recess 41. The socket cover 5 is covered on the ball socket 4 to hold the ball head 311 of the ball head connecting rod 3 in the rounded recess 41 of the ball socket 4. The socket cover 5 comprises a circular base 51 fixedly fastened to the screw holes 42 of the ball socket 4 by screws 43, an annular flange 511 at the center of the circular base 51 through which the ball head connecting rod 3 passes, and a notch 5111 extended through the annular flange 511. The notch 5111 imparts a space in which the ball head connecting rod 3 is moved to change its angular position relative to the ball socket 4. The mounting frame 6 comprises a mounting base 60, a supporting bar 61, and a extension bar 66. The mounting base 60 comprises a plurality of mounting holes 601 adapted for fastening to a ceiling or wall of a supermarket, shop, etc., a coupling hole (not shown), and an annular sliding way 603 surrounding the coupling hole. The supporting bar 61 has a plurality of first mounting holes 612 longitudinally arranged at one end and selectively fastened to the coupling hole of the mounting base 60 by a screw 62 and a nut 63, and a plurality of second mounting holes 613 longitudinally arranged at an opposite end. The extension bar 66 has a plurality of longitudinally spaced mounting holes 661 respectively fastened to the second mounting holes 613 of the supporting bar 61 by screws 67 and nuts 65 and the threaded rod 321 of the ball head connecting rod 3 by a washer 34 and a lock nut 33. Further, the extension bar 66 may be eliminated, and one of the second mounting holes 613 of the supporting bar 61 can be directly fastened to the threaded rod 321 of the ball head connecting rod 3 by a nut 65.

Figure 3:
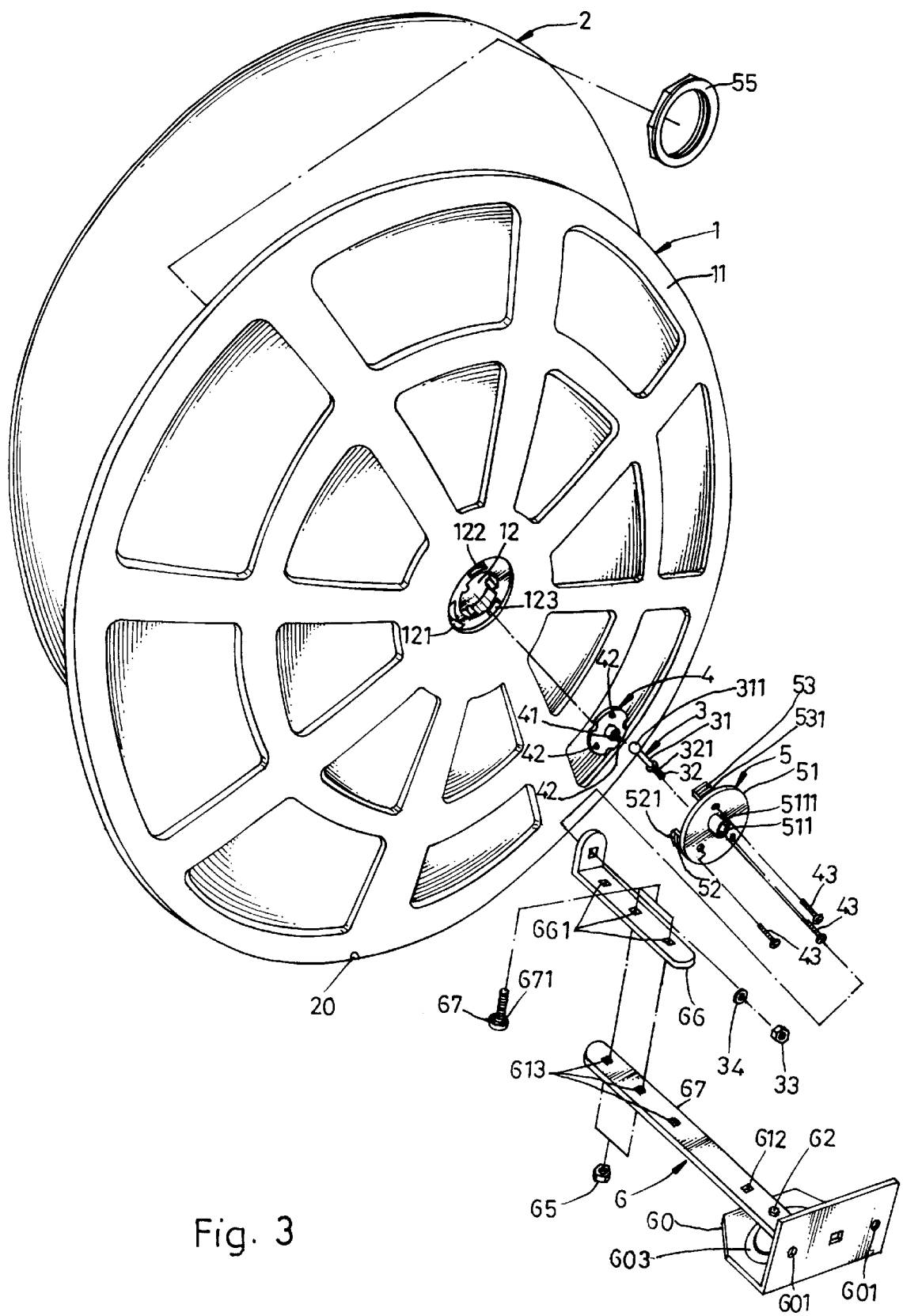
FIG. 3 is an exploded view of a convex lens assembly according to the present invention.
Figure 4:
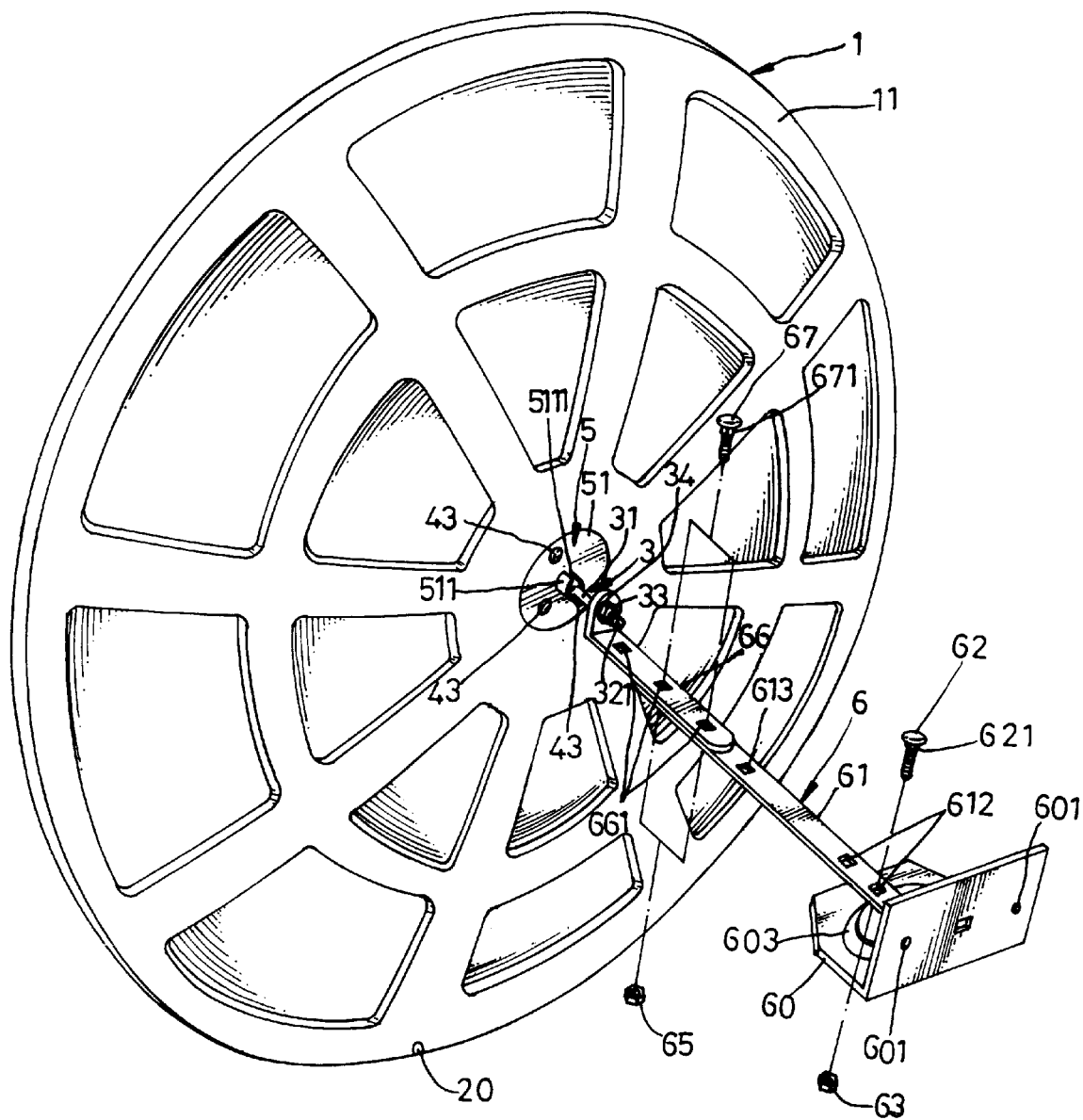
FIG. 4 is an assembly view of the convex lens assembly shown in FIG. 3.
Figure 5:
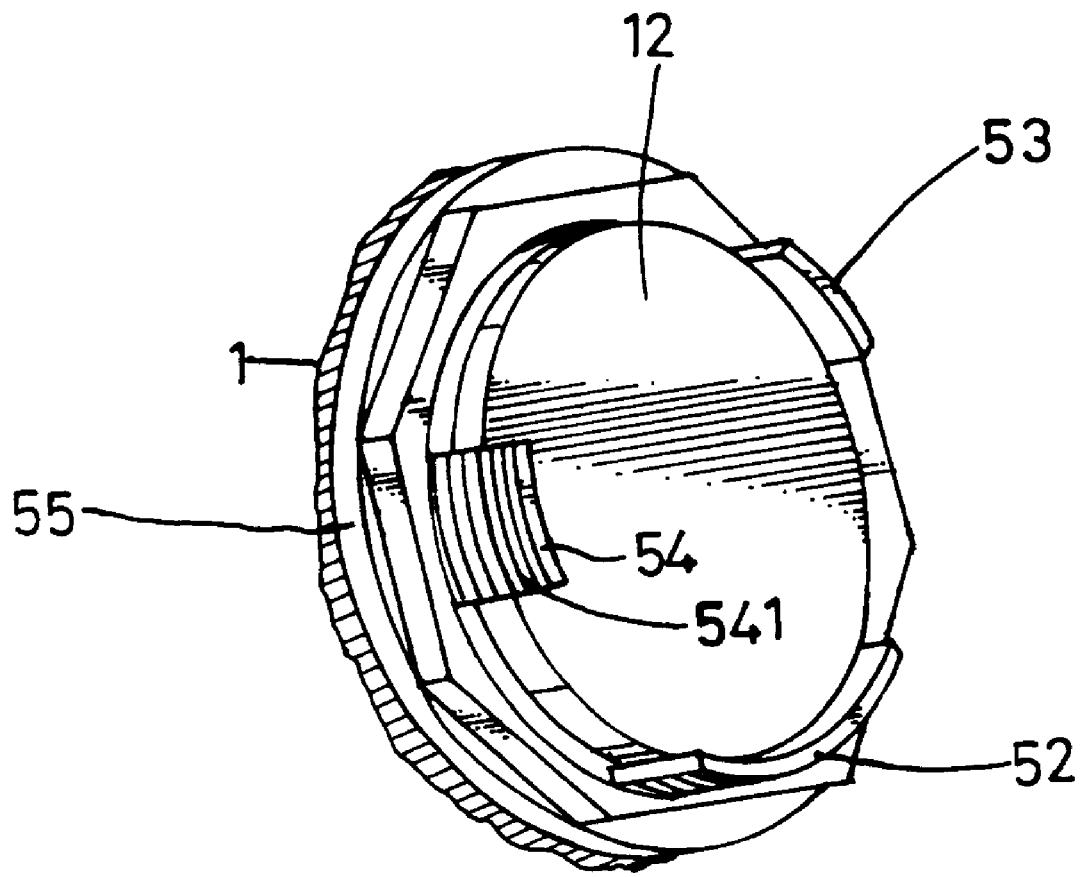
FIG. 5 is a perspective view in an enlarged scale of a part of the present invention, showing the lock nut threaded onto the threads of the locating strips of the socket cover.
Figure 6:
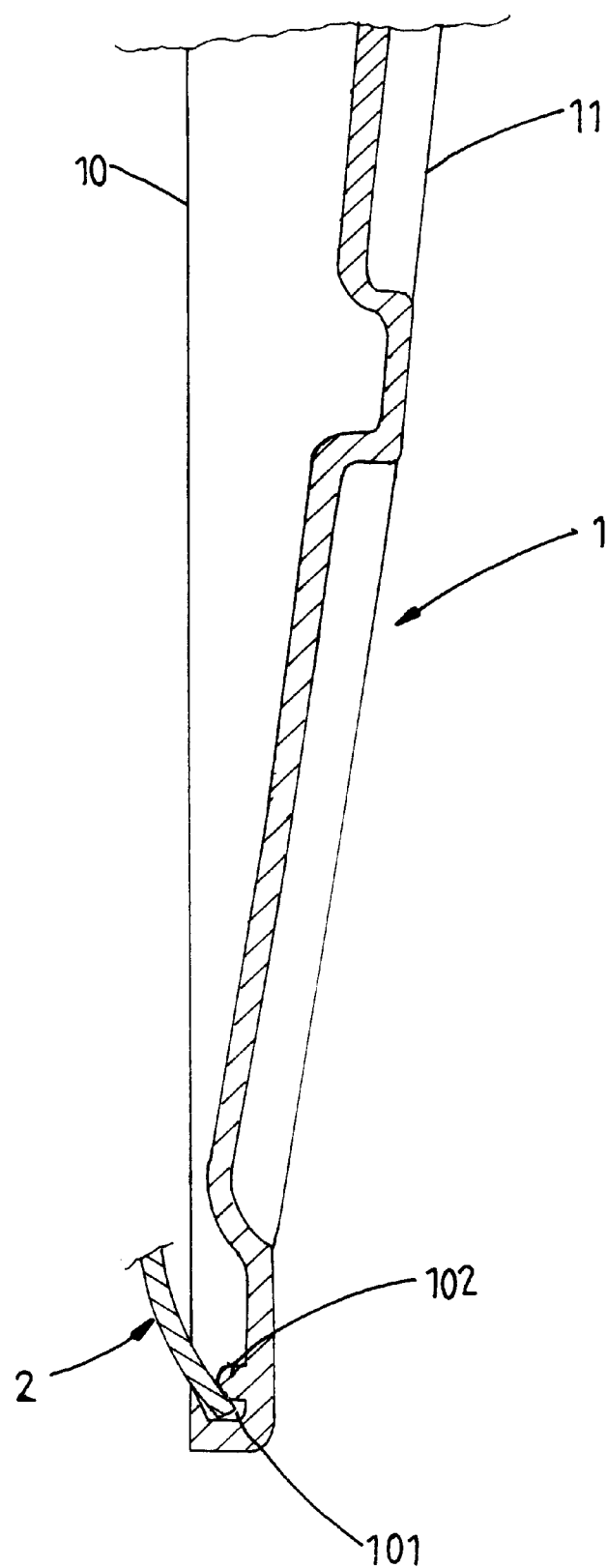
FIG. 6 is a sectional view in an enlarged scale of a part of the present invention, showing the convex lens fastened to the annular groove of the back board.

Referring to FIGS. from 4 to 6 and FIGS. 3 and 4 again, the back board 1 is integrally molded from impact resisting plastic, having an annular groove 101 at its front side 10 near the border, and a plurality of locating rods 102 raised from its front side and equiangularly spaced along the annular groove 101. When the convex lens 2 is attached to the front side of the back board 1, the flanged border area of the convex lens 2 is forced into engagement with the annular groove 101 of the back board 1 and then retained in place by the locating rods 102. The back board 1 further comprises a circular mounting hole 12 at the center of its back side 11 which receives the ball socket 4, and a plurality of locating notches 121; 122; 123 equiangularly spaced around the circular mounting hole 12. The socket cover 5 comprises a plurality of locating strips 52; 53; 54 perpendicularly raised from the border of its circular base 51 and respectively inserted through the locating notches 121; 122; 123 within the circular mounting hole 12 of the back board 1. The locating strips 52; 53; 54 have threads 521; 531; 541 at an outer side. When the locating strips 52; 53; 54 of the socket cover 5 are inserted through the locating notches 121; 122; 123, a nut 55 is threaded onto the threads 521; 531; 541 of the locating strips 52; 53; 54 to fix the socket cover 5 to the back side 11 of the back board 1.

The mounting holes 612; 613 of the supporting bar 61 of the mounting frame 6 and the mounting holes 661 of the extension bar 66 are square holes. The screws 62; 67 which are used to fix the supporting bar 61 to the mounting base 60 and the extension bar 66 have a square shoulder 621; 671 fitting the mounting holes 612; 613; 661.

Further, one locating notch 121 of the back board 1 has a relatively greater size than the other locating notches 122; 123. One locating strip 52 of the socket cover 5 has a greater size than the other locating strips 53; 54. This bigger locating strip 52 is aimed at the notch 5111. By means of this arrangement, the locating strips 52; 53; 54 of the socket cover 5 can be quickly fastened to the locating notches 121; 122; 123 of the back board 1 without considering the installation direction of the socket cover 5.

Figure 7:
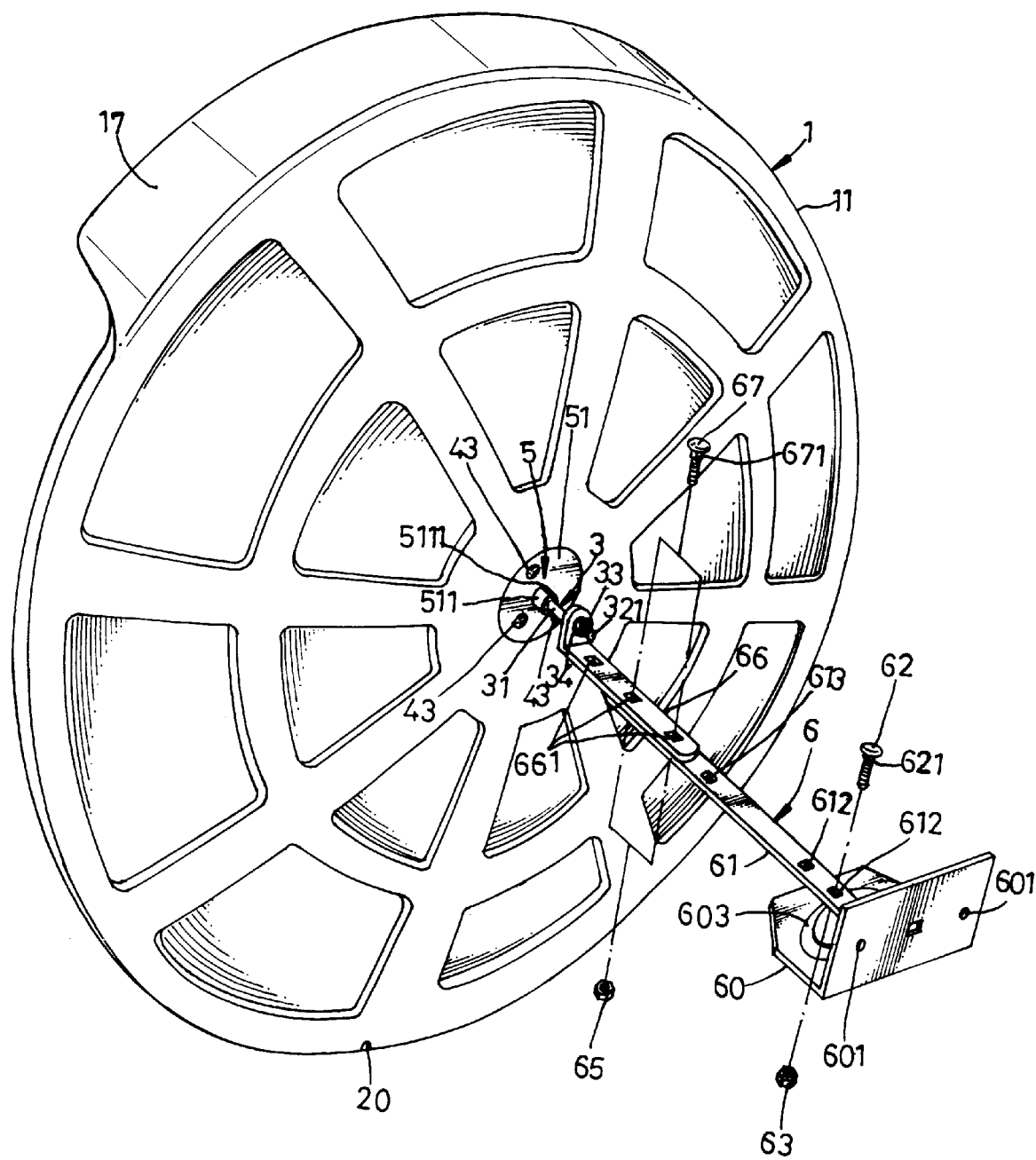
FIG. 7 is a perspective elevational view of an alternate form of the present invention.

Referring to FIG. 7, the back board 1 has a mounting flange 17 raised around the boarder. By means of the mounting flange 17, the convex lens assembly can be fastened to an outdoor support.

I claim:

1. A convex lens assembly comprising:

a back board having a front side, a back side, and an air vent;

a convex lens fastened to the front side of said back board;

a ball head connecting rod having a front end terminating in a ball head, and an opposite end terminating in an threaded rod;

a ball socket fastened to the back side of said back board, said ball socket comprising a rounded recess which holds the ball head of said ball head connecting rod, and a plurality of screw holes equiangularly spaced around said rounded recess;

a socket cover covered on said ball socket to hold said ball head of said ball head connecting rod in the rounded recess of said ball socket, said socket cover comprising a circular base fixedly fastened to the screw holes of said ball socket by screws, an annular flange at the center of said circular base through which said ball head connecting rod passes, and a notch extended through said annular flange, the notch of said socket cover imparting a space in which said ball head connecting rod is moved to change its annular position relative to said ball socket; and a mounting frame, said mounting frame comprising a mounting base, a supporting bar, and a extension bar, said mounting base comprising a plurality of mounting holes adapted for fastening to a supporting wall of a building, a coupling hole, and an annular sliding way surrounding said coupling hole, said supporting bar having a plurality of first mounting holes longitudinally arranged at one end and selectively fastened to the coupling hole of said mounting base by a screw and a nut, and a plurality of second mounting holes longitudinally arranged at an opposite end, said extension bar having a plurality of longitudinally spaced mounting holes respectively fastened to the second mounting holes of said supporting bar by screws and nuts and the threaded rod of said ball head connecting rod by a washer and a lock nut; wherein: said back board is integrally molded from impart resisting plastic, comprising an annular groove at its front side near the border which receives a flanged border area of said convex lens, a plurality of locating rods equiangularly spaced along said annular groove and pressed at the flanged border area of said convex lens to hold down said convex lens, a circular mounting hole at the center of its back side which receives said ball socket, and a plurality of locating notches equiangularly spaced around the circular mounting hole of said back board; said socket cover comprises a plurality of threaded locating strips perpendicularly raised from the border of its circular base and respectively inserted through the locating notches of said back cover within the circular mounting hole of said back board and then fixed in place by a lock nut; the mounting holes of the supporting bar of said mounting frame and the mounting holes of said extension bar are square holes; the screws which are used to fix said supporting bar to said mounting bar and said extension bar have a square shoulder fitting the respective mounting holes of said supporting bar and said extension bar.

2. The convex lens assembly of claim 1, wherein one locating notch of said back board has a relatively greater size than the other locating notches of said back board; one locating strip of said socket cover has a greater size than the other locating strips of said socket cover, the bigger locating strip of said socket cover being aimed at the notch of said socket cover and fitting the bigger locating notch of the said back board.

* * * * *